Oct. 13, 1931.  A. Y. DODGE  1,827,422

BRAKE

Filed Sept. 27, 1928

INVENTOR.
ADIEL Y. DODGE
BY
ATTORNEY

Patented Oct. 13, 1931

1,827,422

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed September 27, 1928. Serial No. 308,600.

This invention relates to brakes, and is illustrated as embodied in an internal expanding brake for an automobile. An object of the invention is to provide simple and inexpensive means for adjustably determining the released or idle position of the friction means of the brake.

In one desirable arrangement, the shoe or equivalent friction means engages a novel stop which includes a part such as a novel bellcrank lever swinging in a plane substantially perpendicular to the plane of the brake. This lever is preferably mounted on the brake backing plate, and I consider it highly desirable to provide means operable from outside the backing plate for adjusting the lever. In the illustrated arrangements this adjusting means is in the form of a threaded member extending through the backing plate and readily turned to make adjustments by engaging the end outside the backing plate.

The above and other objects and features of the invention, including different novel combinations of the various brake parts, and certain desirable particular details of construction, will be apparent from the following description of the illustrative embodiments shown in the accompanying drawings, in which.

Figure 1:
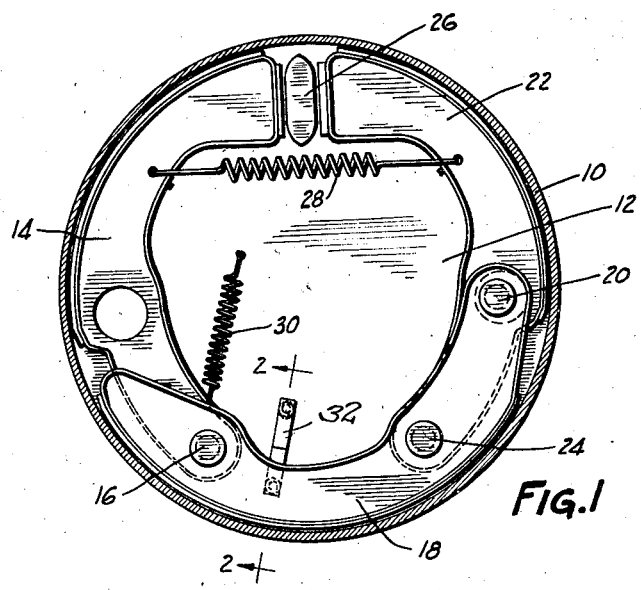
Figure 1 is a vertical section through the brake, just inside the head of the brake drum, and showing the brake shoes in side elevation.

The brake illustrated is of the well-known three-shoe servo type covered by various of my prior applications and patents, and includes a rotatable drum 10, at the open side of which is a support such as a backing plate 12, and within which is the friction means of the brake. In this particular brake the friction means includes a primary or servo shoe 14 connected by a floating pivot 16 to a secondary shoe 18 anchored on a pivot 20 carried by the backing plate, together with an auxiliary shoe 22 anchored on a pivot 24 carried by the backing plate. The brake is applied by means such as a double cam 26 against the resistance of a return spring 28, shoe 18 being applied by the servo shoe 14 against the resistance of an auxiliary return spring 30.

The present invention has to do with adjustably determining the released or idle position of a part of the friction means such as the secondary shoe 18, thus varying the clearance of the shoe to keep it as close to the drum as possible without dragging.

Figure 2:
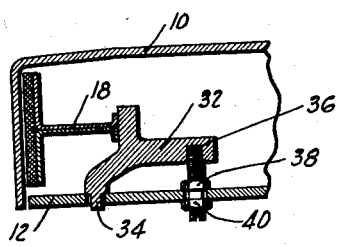
Figure 2 is a partial radial section on the line 2—2 of Figure 1, showing the mounting of the stop.

In the arrangement of Figures 1 and 2 there is a novel stop in the form of a three-arm bellcrank lever 32 having one arm engaged by the inner edge of the web of shoe 18 when the brake is released. Another arm of the bellcrank lever has a projection 34 loosely pivoted in an opening in the backing plate, so that the lever may swing in a plane perpendicular to the plane of the backing plate and of the brake.

The adjustment of this lever is provided for by an adjusting screw 36, or equivalent threaded member, threaded into the third arm of the lever and passing through a slightly larger opening in the backing plate, the end outside the backing plate being formed with a slot for a screw-driver. Screw 36 is provided with parts, such as nuts 38 and 40, engaging opposite sides of the backing plate and preventing lengthwise movement of the screw with respect to the backing plate. Thus turning the screw rocks the lever 32 in a perpendicular plane to adjust its position, and therefore to adjust the released position of the shoe 18 and the clearance of the shoe with respect to the drum when in released position.

Figure 3:
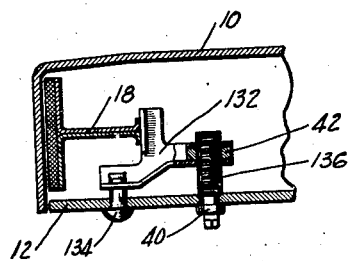
Figures 3 and 4 are sections corresponding to Figure 2, but showing different modifications.

In the arrangement of Figure 3, a generally similar three-arm bellcrank stop lever 132 is loosely pivoted on a pin 134 carried by the backing plate, and has a squared recess for a nut 42 into which an adjusting screw 136 is threaded. In this embodiment lengthwise movement of the screw is prevented by the nut 40 in combination with a shoulder on the adjusting screw which takes the place of nut 38.

Figure 4:
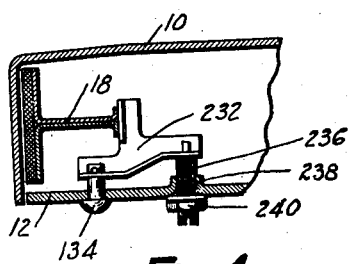

In Figure 4, the adjusting lever 232 has a recess for a pilot projection on the end of a lengthwise-movable adjusting screw 236 threaded through a boss 238 drawn in the backing plate and provided with a locknut 240.

While several illustrative embodiments have been described in detail, it is not my intention to limit the scope of the invention to those particular embodiments, or otherwise than by the terms of the appended claims.

I claim:

1. A brake comprising, in combination, friction means, and a stop determining the released position of the friction means and including a part engaged by the friction means when the brake is released and which part is adjustable angularly in a plane substantially perpendicular to the plane of the brake.

2. A brake comprising, in combination, friction means, and a stop determining the released position of the friction means and including a part engaged by the friction means when the brake is released and which part is adjustable angularly in a plane substantially perpendicular to the plane of the brake, together with an adjusting member operable to swing said part in said plane to vary the clearance of the friction means in released position.

3. A brake comprising, in combination, a backing plate, friction means mounted on said plate and a stop determining the released position of the friction means and including a part engaged by the friction means when the brake is released and which part is adjustable angularly in a plane substantially perpendicular to the plane of the backing plate.

4. A brake comprising, in combination, a backing plate, friction means mounted on said plate and a stop determining the released position of the friction means and including a part engaged by the friction means when the brake is released and which part is adjustable angularly in a plane substantially perpendicular to the plane of the backing plate, together with an adjusting member operable from outside the backing plate to swing said part in said plane to vary the clearance of the friction means in released position.

5. A brake comprising, in combination, a backing plate, friction means carried by the backing plate, a pivoted lever mounted on said plate and adapted to swing in a plane perpendicular to the plane of said plate and serving as a stop to determine the released position of the friction means, and an adjusting member for moving said lever to vary the clearance of the friction means.

6. A brake comprising, in combination, a backing plate, friction means carried by the backing plate, and a pivoted lever mounted on said plate and adapted to swing in a plane perpendicular to the plane of said plate and serving as a stop to determine the released position of the friction means.

7. A brake comprising, in combination, a backing plate, friction means carried by the backing plate, a pivoted lever mounted on said plate and adapted to swing in a plane perpendicular to the plane of said plate and serving as a stop to determine the released position of the friction means, and a thrust member extending through the plate and adjustable lengthwise to move said lever in said plane to vary the clearance of the friction means.

8. A brake comprising, in combination, a backing plate, friction means carried by the backing plate, a pivoted lever mounted on said plate and adapted to swing in a plane perpendicular to the plane of said plate and serving as a stop to determine the released position of the friction means, and a threaded member adjustable lengthwise to move said lever in said plane to vary the clearance of the friction means.

9. A brake comprising a backing plate and a pivoted bellcrank stop lever adapted to swing in a plane perpendicular to the plane of the plate.

10. A brake comprising a backing plate, a pivoted bellcrank stop lever adapted to swing in a plane perpendicular to the plane of the plate, and an adjusting member extending through the plate and operable to move said lever to adjust the brake.

11. A brake comprising a backing plate, a pivoted bellcrank stop lever adapted to swing in a plane perpendicular to the plane of the plate, an adjusting member carried by the plate and engaging said lever and means for locking the adjusting member.

In testimony whereof, I have hereunto signed my name.

ADIEL Y. DODGE.